Jan. 26, 1932.　　　H. S. McILVAIN　　　1,843,038
REFRIGERATED PACKAGE AND METHOD
Filed Oct. 29, 1930
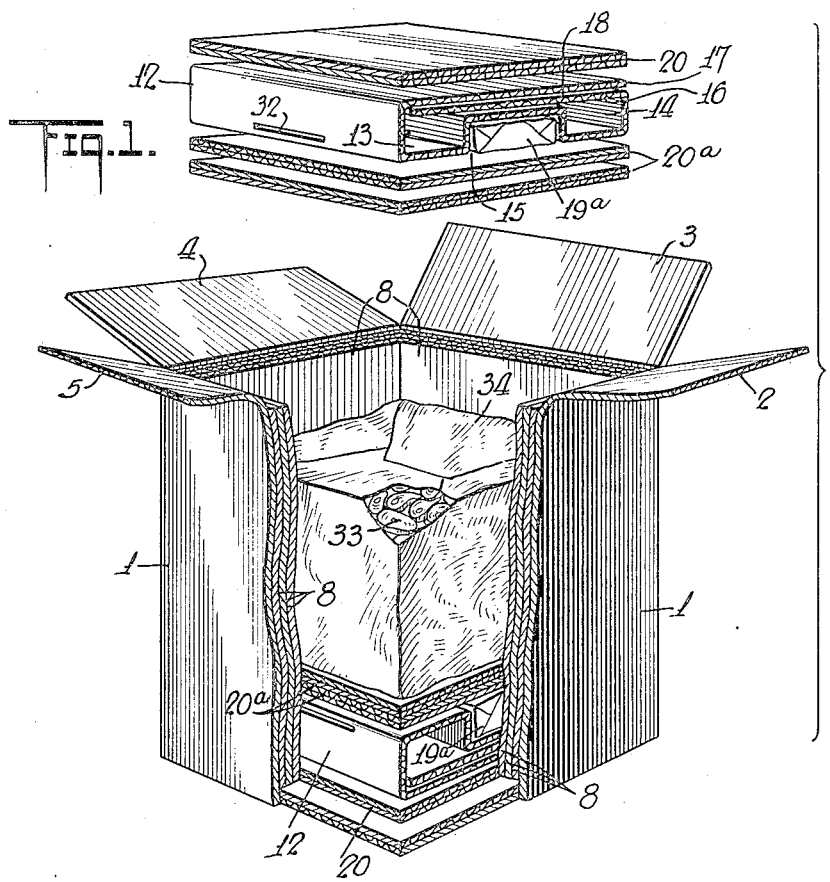
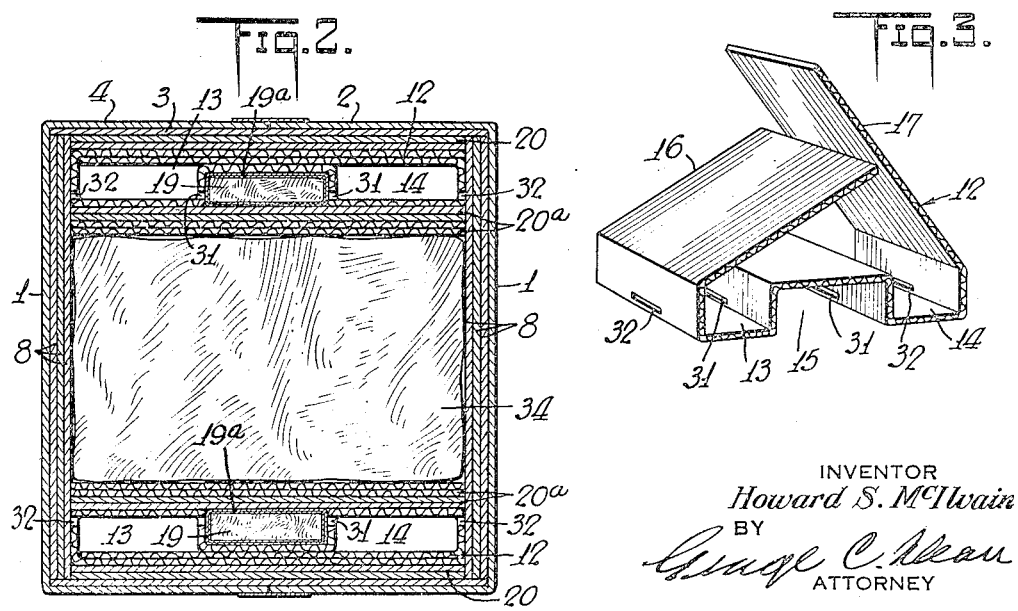
INVENTOR
Howard S. McIlvain
BY
George C. Akan
ATTORNEY Patented Jan. 26, 1932

1,843,038

UNITED STATES PATENT OFFICE

HOWARD S. McILVAIN, OF BELLEVILLE, NEW JERSEY, ASSIGNOR TO DRYICE EQUIPMENT CORPORATION, OF NEW YORK, N. Y., A CORPORATION OF DELAWARE

REFRIGERATED PACKAGE AND METHOD

Application filed October 29, 1930. Serial No. 491,853.

This invention involves some of the general principles applicable to the use of solid carbon dioxide, as set forth in the Slate Patent No. 1,511,306, granted October 14th, 1924, and though it was primarily devised as a solution of certain problems in connection with refrigerated packages, certain of the principles involved are applicable to other cases where solid carbon dioxide is used for refrigerating a food product, especially where it is desirable to maintain the product in a substantially pure atmosphere of carbon dioxide gas.

As explained in said patent, the solid carbon dioxide is much heavier than water and has a very low melting point, something like 112°–114° below zero Fahrenheit. When melted at pressures near atmospheric it sublimates directly to a gas without any intermediate liquid state. Hence, there is no liquid to wet things but, on the contrary, the gas being anhydrous, tends to dry up moisture. Moreover, the gas is far heavier than air so that it will displace air and, if the container is not too leaky, will completely exclude it. Such heavy, dry gas is a very efficient heat insulator, and for purposes of my present invention, is effectively utilized so that the insulating and heat carrying effect of the gas plus the refrigerating effect due to latent heat absorbed in sublimating the solid, and the sensible heat absorbed by the resulting gas in warming up from such a low temperature, may be utilized so as to make the combined results from a given volume of solid carbon dioxide, ten to twenty times as effective as the same volume of water ice, although its actual B. t. u. refrigerant value is only about double.

All of the above qualities when properly used particularly adapt solid carbon dioxide for the specific purpose of my present invention, which particularly concerns distributing methods and means, particularly self refrigerated packages for shipping food products in comparatively small quantities.

Since the above mentioned patent of Slate, it has been common to make large-bulk shipments of unfrozen food products refrigerated with solid carbon dioxide; and also shipment of frozen products in package units containing said refrigerant, but to my knowledge, it has not heretofore been found practicable to similarly transport or ship relatively small quantities of unfrozen food products such as meat, in packages so refrigerated.

The fact seems to be that in the relatively large space available in a refrigerator car or even in a domestic refrigerator, it is not difficult to insulate the solid carbon dioxide so that, as described by Slate, the amount of the solid, and its evaporation rate, may be made to correspond with the amount of in-leaking heat to be refrigerated against and the time for which refrigeration is required, so that product remote from the refrigerant may easily be kept unfrozen. In paper cartons and other similar throw-away transportation containers, it has been found very difficult to arrange the quantity, location and melting rate of the solid carbon dioxide with reference to the food products so that the latter will be adequately refrigerated and maintained in an insulating atmosphere of the evaporated gas, without having the food products and the refrigerant in freezing proximity, the alternative being that remote parts of the food products will be insufficiently refrigerated. Consequently, for such throw-away packages, the business has been largely limited to frozen products, particularly those which are not injured by severe over-freezing. In connection with such products, it has become the practice to lengthen the possible transportation period by packing the solid carbon dioxide in freezing proximity to, say, ice cream so that the ice cream may absorb heat from the solid, thereby becoming over-frozen to a very low temperature. In certain cases it has been proposed, as in patent to Cusack 1,595,385, to proportion the carbon dioxide, and its insulation from the ice cream so that the cycle of over-freezing and warming back to standard may be predetermined for a desired period covering the time between shipment of the package and use of the ice cream. This has the advantage that the ice cream is utilized as a storage reservoir of refrigerant value, thereby lengthening the period of successful refrigeration, far beyond the time when the solid carbon dioxide has been entirely evaporated.

In this state of the art, I have discovered the somewhat paradoxical principle that by insulating the outer container heavily enough, it becomes possible to insulate adjacent parts of the food products from the solid carbon dioxide sufficiently to prevent overfreezing or indeed any freezing thereof while at the same time not running any risk of having remote parts of the product insufficiently refrigerated. That is to say, the exterior insulation may be made sufficient so that the entire interior will be at a relatively uniform temperature and hence may safely be of a far higher temperature than has heretofore been possible in a transportation package.

My invention also includes certain details of construction of the package whereby such uniform, relatively high internal temperature may be insured by proper disposition of the solid carbon dioxide and provision for progressive leakage of the gas therefrom outward through the exterior insulation, while protecting the products therefrom. As a result of the uniformity and relatively high level of the internal temperature plus the heavy external insulation, the evaporation rate of the solid carbon dioxide is kept down so that the expedient of storing refrigerant value by superfreezing the product is avoided.

Consequently, whatever refrigerant value there is left in the package when it is open for use is in the form of unevaporated solid carbon dioxide which may be used as a refrigerant for any desired purpose rather than in the objectionable form of an overfrozen product which must be warmed to usable temperature.

The above and other features of my invention will be more evident from the following detailed description in connection with the accompanying drawings, in which Fig. 1 is a perspective view, partly in section, showing most of the elements assembled and others in position for assembly;

Fig. 2 is a characteristic vertical section, showing the same parts assembled in a complete package; and Fig. 3 is a perspective view of one of the elements partly folded to final form.

In these drawings, the specific structure in which the principles of my invention are embodied includes an exterior protective and insulating casing which may be an ordinary carton of corrugated paperboard comprising a corrugated sheet glued between two plain outer sheets. The outer sheet is preferably formed or provided with a layer or coating of material relatively impervious to carbon dioxide gas, such as asphalt. The carton comprises the four sides 1 and end flaps 2, 3, 4 and 5, adapted to be folded over and secured with pasters to constitute the top and bottom of the package, in the usual way. The sides 1 of the carton are reenforced by several layers of ordinary permeable corrugated paperboard 8. These add to the structural strength, but their further and more important function is to afford a thick multiple-layer outer wall readily permeable by the carbon dioxide gas which will be forced outward therethrough and affording interior passages for circulation of said gas, to carry out of the package sensible heat inleaking by conduction through said walls.

Above the bottom and again below the top flaps 1, 2, 3, 4 are fitted two layers of corrugated board 20, so that all six outer walls of the package consist of four layers of corrugated board. There are two supplies of solid carbon dioxide 19, 19, one located at the top and the other at the bottom of the package. The product 33 enclosed in a bag 34, preferably of vegetable parchment, is located between but separated from said refrigerant by cross laid layers of corrugated board 20a, sufficient in number to prevent too much heat transfer by conduction from the product to the refrigerant. Furthermore, these pieces 20a are preferably a snug fit against the vertical walls 8, so that they make it difficult for convection currents to flow from the refrigerant to the product.

On the other hand, a perfectly free path for escape of gas to the permeable insulating outer walls 8, 8, 1, is insured by suitable spacing and protecting means 12, a simple and effective form of which is made by bending a single sheet of corrugated board in the manner shown, so as to form the two insulating gas spaces 13, 14 and the intermediate recess 15 in which the refrigerant 19 is fitted.

The two ends, 16, 17, of the spacer 12 are overlapped as indicated at 18, thus affording two more thicknesses of insulation, making a total of seven layers between the refrigerant and the exterior, at both bottom and top of the package. They also afford a double thickness platform whereby the thrust of the load is distributed upon the four vertical walls of the spacer. Supplies of solid carbon dioxide preferably wrapped in two or more thicknesses of newspaper or the like, as shown at 19a, are fitted into the recesses 15, of each of the spacers and the spacers are symmetrically placed, one in the bottom and the other in the top with the overlapping flaps outermost and the insulating layers 20a interposed between them and the products 33 enclosed in bag 34.

It will be evident that the porous paper wrapper for the solid carbon dioxide operates to enclose it in an atmosphere of substantially pure gas, continuously oozing outward through the pores of the wrapper and preventing any inbreathing of air. This gas has free exit at each end of the recess 15, to two of the opposite outer walls of the package, and provision for a similar free exit of gas toward the other opposite walls is insured by outlets 31 leading into each of the hollow spaces 13, 14, and from said space through outlets 32. As the hollow spaces 13, 14 are always full of gas freshly evaporated from the solid, they afford additional protection to the latter and the arrangement is such that the flow of gas is always from the solid carbon dioxide outward into and through the permeable outer wall, thus carrying sensible heat out of the package and preventing inbreathing of warm air from the exterior. The gas has to penetrate but one layer of the corrugated lining in order to be free for flow lengthwise of the passages therein. This, in combination with the above described arrangement of the insulating layers 20a facilitates outward circulation of the gas into the exterior walls rather than to the refrigerated product.

As noted above, layers 20a reduce the conductive transfer of heat from the products 33, to such small amount as will substantially balance inleak through the sides of the product that rest against the walls 8, 8. Convection transfer is minimized because the arrangement is such as to practically prevent closed circuit flow of gas from the warmer regions back to the refrigerant, and because the gas that is forced out from the refrigerant is afforded an easier exit outward through the outer walls than into contact with the perishable product. Such progressive outflow of gas opposes inbreathing of warm air from the exterior and acts by convection to remove inleaking heat to the exterior of the package.

In the drawings, the spacers are shown with refrigerant cavities 15 parallel and, while it is sometimes desirable to arrange these at right angles to one another so that the ends of one refrigerant supply may be in contact with different side walls from those contacted by the ends of the other refrigerant supply, this is hardly necessary because of the outlets 32, 31, which afford free exit to the gas, at right angles to the length of the refrigerant 19.

By the above arrangement of spacers with respect to the load, both ends of the package have a large volume gas layer continuously maintained and perfectly free to permeate the hollow outer walls, to traverse the same and keep them cool and one or the other of the sources is at a high level so that a top to bottom downflow of the cold gas through the walls is insured and tendency to deficient refrigeration at the top and over-refrigeration or freezing at the bottom is prevented.

It will be evident that structurally considered the package is a great improvement over anything known in the prior art, particularly as to the spacers for maintaining the bulk of the package independently of the bulk of the diminishing refrigerant.

The type and quantity of the interior insulation as well as the outer carton itself may be chosen to suit the requirements for any particular product or condition and by reducing the insulation, similar functional and structural features may be availed of for frozen products, or for superfreezing operation.

The inner insulation may be of any material permeable to the gas and affording relatively low resistance paths for flow of the gas edgewise thereof. The outer receptacle may be of wood if desired, the layers of insulation between the refrigerant and the product may also be of wood such as thin sheets of balsa wood. If corrugated board is used, the same may be of single walled or double walled type or, in fact, any material and any quantity of it that is found suitable may be used under the varying conditions.

Instead of having the slots 31 and 32, there may be a plurality of comparatively small openings through the same vertical sections or a depression might be made in the horizontal sections 21 and 23, leading from the refrigerant chamber to the remote portions of the refrigerated chamber. Another manner in which this may be provided for is to furnish a spacer of smaller outer dimensions than the inner dimensions of the refrigerating space, thus providing an entirely free border space for supplying the gas to the four side walls.

While I have described a package, my invention is not limited to a package, strictly speaking, but is in reality an apparatus to be used for refrigerating and is practically applicable to the transportation and storage of meat, fish and fowl in comparatively small quantities.

In the case of meats to be preserved unfrozen, the package may be packed as follows:

The meat is pre-chilled to 35° before packing, and the packing should be done in a cold room if possible, in order to avoid warming of the meat. To start packing, fold over the flaps 2, 4, 3, 5, at one end of the carton and seal the seams with a paster, insert liners 8, pads 20 and folded spacer 12 with recess upward. Wrap the solid carbon dioxide in, say, twelve thicknesses of newspaper, and place in the spacer; then insert the two corrugated pads 20a.

Then insert the vegetable parchment paper liner 34, which may be a bag of suitable size or merely a properly folded sheet with the edges overlapped. In any case, free upper edges should be long enough for folding over as shown. The meat may then be packed in this wrapper to a height sufficient to snugly fit the space provided for it. The flaps are then folded over and covered with two corrugated paper pads 20a. Over this is fitted a top spacer with solid carbon dioxide wrapped as before, in the space 15 presented downward. The remaining pad 20 may then be placed in position and if any space remains it can be filled with paper or other packing material so that the entire interior will be solidly filled when the top flaps are folded down. These flaps when folded down have all open edges sealed with paster tape.

It is preferable to have the package kept at all times with either the top or the bottom upward and with this in view, a label "This side up" may be applied to the top of the package.

As the method of packing and particularly the use of the spacers 16 render the entire package including contents, mechanically solid, regardless of shrinkage of the solid carbon dioxide, it will be evident that the same method of packing may be employed with the same advantages even where it is not necessary to prevent freezing of the product.

I claim:

1. A method of preparing a solidly packed, self-refrigerating, non-freeze package comprising freezable product and solid carbon dioxide refrigerant, which method includes packing the unfrozen products in a container with a separate supply of solid carbon dioxide at each end thereof, partitioning the products from the solid by heat insulating material sufficient to prevent freezing of the product by conductive transfer of heat through the partition and affording separate paths of exit of gas leading from the solid to interspaces in the walls of the container, thereby minimizing flow of the gas into the space containing the refrigerated product.

2. A method of preparing a solidly packed, self-refrigerating, non-freeze package comprising freezable product and solid carbon dioxide refrigerant, which method includes packing the unfrozen products in a container with a separate supply of solid carbon dioxide at each end thereof, partitioning the products from the solid by heat insulating material sufficient to prevent freezing of the product by conductive transfer of heat through the partition and affording paths of exit of gas from the solid into and along interspaces in the walls of the container, thereby minimizing flow of the gas into the space containing the refrigerated product; and reducing tendency to closed circuit thermo circulation between the refrigerant and the product by enclosing both supplies of refrigerant in a gas-permeable envelope or wrapper through which the gas can be forced.

3. A method of preparing a solidly packed, self-refrigerating, non-freeze package comprising freezable product and solid carbon dioxide refrigerant, which method includes packing the unfrozen products in a container with a separate supply of solid carbon dioxide at each end thereof, partitioning the products from the solid by heat insulating material sufficient to prevent freezing of the product by conductive transfer of heat through the partition and affording paths of exit of gas from the solid into and along interspaces in the walls of the container, thereby minimizing flow of the gas into the space containing the refrigerated product; and reducing tendency to closed circuit thermo circulation between the refrigerant and the product by enclosing said products in a paper wrapper or bag.

4. A method of preparing a solidly packed, self-refrigerating, non-freeze package comprising freezable product and solid carbon dioxide refrigerant, which method includes packing the unfrozen products in a container with a separate supply of solid carbon dioxide at each end thereof, partitioning the products from the solid by heat insulating material sufficient to prevent freezing of the product by conductive transfer of heat through the partition and affording paths of exit of gas from the solid into and along interspaces in the walls of the container, thereby minimizing flow of the gas into the space containing the refrigerated product; and reducing tendency to closed circuit thermo circulation between the refrigerant and the product by enclosing both supplies of refrigerant in a gas-permeable envelope or wrapper through which the gas can be forced, and said products in a paper wrapper or bag.

5. A method of preparing a self-refrigerating non-freezing package of freezable product, which includes enclosing the products with supplies of solid carbon dioxide above and below the same, in a heavily insulated container having permeable walls and interior flow paths for escape of gas evaporating from said solid, partitioning the products from each of the supplies of solid carbon dioxide by insulating material sufficient to prevent over-freezing of the products by conductive heat transfer and protecting the products from exterior heat by permitting flow of gas into the permeable walls and edgewise within the same through separate paths leading from the solid to said permeable walls.

6. A method of preparing a self-refrigerating non-freezing package of freezable product, which includes enclosing the products with supplies of solid carbon dioxide above and below the same, in a heavily insulated container having permeable walls and interior flow paths for escape of gas evaporating from said solid, partitioning the products from each of the supplies of solid carbon dioxide by insulating material sufficient to prevent overfreezing of the products by conductive heat transfer and protecting the products from exterior heat by permitting flow of gas into the permeable walls and edgewise within the same, the insulation of the solid carbon dioxide from exterior heat being greater than the insulation afforded the products by the side walls of the package.

7. An insulating container having outer walls and inner walls, the inner walls being permeable to carbon dioxide gas and the interspace between the walls affording low resistance paths for flow of gas edgewise thereof; and, packed within said container, perishable products in an intermediate portion thereof, and a supply of solid carbon dioxide at each end thereof; each supply of said solid being separated from said products by transversely fitted insulating material sufficient to prevent freezing of the products by conductive transfer of heat; and means affording exit of gas from each of the supplies of solid carbon dioxide through said transverse material so that the gas may permeate the inner walls of the container, and circulate in the interspaces thereof, the walls of the container with the gas escaping therethrough being designed to afford protection from the exterior heat as great as the protection of the products from the solid carbon dioxide.

8. An insulating container having outer walls and inner walls, the inner walls being permeable to carbon dioxide gas and the interspace between the walls affording low resistance paths for flow of gas edgewise thereof; and, packed within said container, perishable products in an intermediate portion thereof, and a supply of solid carbon dioxide at each end thereof; each supply of said solid being separated from said products by transversely fitted insulating material sufficient to prevent freezing of the products by conductive transfer of heat; and means affording exit of gas from each of the supplies of solid carbon dioxide so that the gas may permeate the inner walls of the container and circulate in the interspaces thereof; said products being further protected from convection currents of gas by enclosing the same in a suitable paper covering.

9. An insulating container having outer walls and inner walls, the inner walls being permeable to carbon dioxide gas and the interspace between the walls affording low resistance paths for flow of gas edgewise thereof; and, packed within said container, perishable products in an intermediate portion thereof, and a supply of solid carbon dioxide at each end thereof; each supply of said solid being separated from said products by transversely fitted insulating material sufficient to prevent freezing of the products by conductive transfer of heat; and means affording exit of gas from each of the supplies of solid carbon dioxide so that the gas may permeate the inner walls of the container and circulate in the interspaces thereof; each of the supplies of carbon dioxide in the end spaces being protected from thermo circulating convection currents, by a suitable paper envelope or wrapper.

10. An insulating container having outer walls and inner walls, the inner walls being permeable to carbon dioxide gas and the interspace between the walls affording low resistance paths for flow of gas edgewise thereof; and, packed within said container, perishable products in an intermediate portion thereof, and a supply of solid carbon dioxide at each end thereof; each supply of said solid being separated from said products by transversely fitted insulating material sufficient to prevent freezing of the products by conductive transfer of heat; and means affording exit of gas from each of the supplies of solid carbon dioxide so that the gas may permeate the inner walls of the container and circulate in the interspaces thereof; said products being further protected from convection currents of gas by enclosing the same in a suitable paper covering; and each of the supplies of carbon dioxide in the end spaces being protected from thermo circulating convection currents, by a suitable paper envelope or wrapper.

11. A refrigerating apparatus comprising an outer receptacle, a refrigerating space within said receptacle, unattached upper and lower combined spacers and refrigerant containers at the ends of the refrigerating space, the same being insulated from said space.

12. A refrigerating apparatus comprising an outer receptacle, a refrigerated space within said receptacle, refrigerant containers within said space and arranged to allow the refrigerant to contact with two sides only of the outer receptacle and passages through said containers for passage of gas from said refrigerant to said sides.

13. A refrigerating apparatus comprising an outer receptacle, a refrigerating space within said receptacle, combined refrigerant containers and spacers within said space, said containers being arranged to maintain the refrigerant in its original position and provide insulating spaces along the sides of the refrigerant for the reception of gas and unrestricted paths leading from the refrigerant to said insulating spacers.

14. A refrigerating apparatus comprising an outer receptacle, a refrigerated space within said receptacle and combined spacers and refrigerant containers within said outer receptacle, said spacers arranged to receive a quantity of solid carbon dioxide and permit gas therefrom to flow directly to the walls of the refrigerating space through openings in said spacers.

15. A refrigerating apparatus comprising an outer receptacle, a refrigerating space within said receptacle, combined spacers and refrigerant containers having a refrigerant receiving depression in the middle, and hollow insulating spaces on either side of said refrigerant receiving space.

16. A refrigerating apparatus comprising an outer receptacle, a refrigerating space within said receptacle, combined spacers and refrigerant containers having a refrigerant receiving depression in the middle, and hollow insulating spaces on either side of said refrigerant receiving space and openings between said depressions and said hollow spaces.

17. A refrigerating apparatus comprising an outer receptacle, a refrigerating space within said receptacle, combined spacers and refrigerant containers having a refrigerant receiving depressions in the middle, and hollow insulating spaces on either side of said refrigerant receiving space and openings between said depressions and said hollow spaces and openings from said hollow spaces whereby carbon dioxide gas from said refrigerant may circulate through said hollow spaces and pass to the sides of said refrigerated space.

18. A refrigerating apparatus comprising an outer receptacle, a refrigerating space within said outer receptacle, a combined spacer and container for solid carbon dioxide, said combined spacer and container arranged to insulate the refrigerant from the outside and other insulation between the refrigerant and refrigerating space to prevent over-refrigeration of the product within said refrigerated space.

19. A refrigerating apparatus comprising an outer receptacle, a refrigerating space within said receptacle, an unattached combined spacer and refrigerant container having a substantially rectangular refrigerant chamber, the refrigerant being solid carbon dioxide, said combined spacer and container being arranged to accord insulation on three sides of said solid carbon dioxide and other insulation on the fourth side and between said solid carbon dioxide and the refrigerating space to prevent over-refrigeration of the product in said space.

20. A package refrigerated with solid carbon dioxide comprising an outer receptacle, insulating liners around the inner walls of said receptacle and an assembly consisting of a combined insulating refrigerant container and spacer, other insulation between the refrigerant and refrigerated product, one of said assemblies being in each end of said receptacle and maintained apart by the refrigerated product.

Signed at New York, in the county of New York and State of New York, this 21st day of October, A. D. 1930.

HOWARD S. McILVAIN.